MULTI-SYSTEM SHARING OF DATA PROCESSING UNITS

Filed Aug. 3, 1966

INVENTORS
JAMES C. COOPER
WILLIAM P. WISSICK

BY Melvin P. Williams

ATTORNEY

CHAN SEL OR REQ

FIG. 13 BIASING PREFERENCE

ACCEPT (29)

3,445,819

MULTI-SYSTEM SHARING OF DATA PROCESSING UNITS

James C. Cooper, Atlanta, Ga., and William P. Wissick, Rhinebeck, N.Y., assignors to International Business Machines Corporation, Armonk, N.Y., a corporation of New York Filed Aug. 3, 1966, Ser. No. 569,856
Int. Cl. G11b *13/00*
U.S. Cl. 340—172.5 15 Claims

ABSTRACT OF THE DISCLOSURE

The invention is predicated on concepts which include the fact that an independent unit, such as a storage device, will at times need to be available to a system on an unshared basis, and that the various systems which may be sharing such devices are not easily connected into a single asynchronous clocking arrangement for the controlling of both systems. Although the invention may be utilized with an sort of independent device, or service device, reference thereto hereinafter is made with respect to a storage device, as an example, for simplicity.

*Field of art*

This invention relates to data processing, and more particularly to improved apparatus for controlling the sharing of independent devices by a plurality of systems.

*Prior art*

In the data processing art, the usage of a plurality of systems in a single, related configuration has become more prevalent in recent years. Many problems concerned with the interlocking of a plurality of systems have developed, including the problem of possibly permitting more than one system to access a single independent unit, such as a storage device, or to provide more than one independent device for accessing by a system where that system does not have exclusive use thereof.

*Object*

An object of the present invention is to provide an improved control apparatus for controlling the accessing of a plurality of independent devices by a plurality of systems.

In accordance with the present invention, access determining apparatus is provided to allocate usage of a given storage device to a particular system on a controlled basis, the control reversing from a first system to a second system whenever the second system requests use of a storage device which is currently allocated to the first system, and vice versa. In accordance with a further aspect of the invention, a storage request signal is utilized either as a select signal for starting a storage operation (when the desired device is allocated to the requesting system), or as a request signal for reversing the status of storage allocation (in the event that the particular storage apparatus of which the request is being made is currently allocated to another system).

In accordance with an alternative embodiment of the invention, the apparatus can be biased in such a way that one particular storage may be considered to be perfectly allocated to a corresponding system, concurrently with another storage allocated to another system on a preferential basis. In this alternative embodiment, whenever a storage device is indicated as no longer being busy to the non-preferred system, the circuitry in accordance herewith automatically transfers allocation of that storage unit back to the preferred system. In this embodiment, either system may request a storage device in the same fashion as described hereinbefore, notwithstanding that the storage device might then be in use, transfer taking place after the particular usage ceases. In other words, this embodiment operates in the basic fashion described hereinbefore, but further allocates any idle storage device to a system which is designated as a preferred system for that device.

The invention permits connecting multiple systems and multiple independent devices, such as storage devices, in a shared environment, while maintaining non-shared characteristics in certain instances. The allocation of a storage device to a system is completely flexible, and this allocation is permitted to change in dependence upon operating conditions extant at any given time. In a further embodiment, one system will prevalently appear to be on an unshared basis with a particular storage due to biasing of preference which may be effected readily with the present invention. Synchronization as between various systems is avoided by utilizing a minimum of synchronization apparatus, each storage becoming synchronized with the particular system at the time that a reference is being made thereto. All possibilities of race conditions which might result from more than one system trying to access a particular storage at one particular time are avoided by means of the present invention. The invention is readily implemented in a variety of hardware configurations, at relatively low cost, and with a minimum of interconnections between the storage devices and the systems involved.

Although the embodiment herein utilizes high speed storage devices as an example of independent units, the applicability of the invention to other shared devices is obvious. Thus there is provided a relatively simple, highly efficient and sophisticated random accessing control for a plurality of independent devices in an environment including a plurality of controlling systems.

The foregoing and other objects, features, and advantages of the present invention will become more apparent in the light of the following detailed description of preferred embodiments thereof, as set forth in the accompanying drawings.

In the drawings:

FIG. 13 is a broken away, schematic block diagram of the circuit of FIG. 9, modified for preferential bias according to a second embodiment of the present invention.

Figure 1:
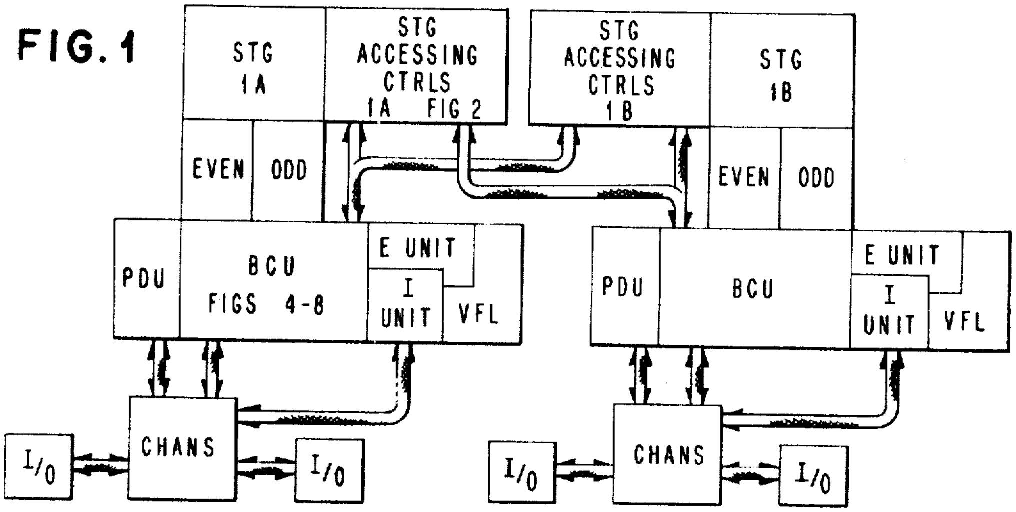
FIG. 1 is a schematic block diagram of a data processing complex including a plurality of systems and a plurality of storage devices in accordance with the present invention.

The present invention is illustrated in terms of a "Large Scale Data Processing System" disclosed in a copending application of the same assignee filed by Olin L. MacSorley et al., on Apr. 6, 1965, Ser. No. 455,326. The present embodiment includes details which illustrate how the system of said copending application would be modified to utilize the sharing apparatus of the present invention. For instance, FIG. 1 herein illustrates that the present embodiment contemplates two systems of the type disclosed in said copending application, each of which however has a single storage frame (1A, 1B), whereas the single system of said copending application has two storage frames. In the present embodiment, each of two complete CPU's (including E unit, I unit, and bus control unit), together with any other desired apparatus, as illustrated in FIG. 1, have directly, physically associated therewith, one storage frame which contains an even half and an odd half: specifically, SYSTEM ONE is physically attached to storage 1A, and SYSTEM TWO is physically attached to storage 1B. The system of said copending application has storage frames 1A and 1B both attached to its single BCU. The illustration of FIG. 1 herein, however, contemplates functional independence between the two storage devices and the two systems to which these storage devices are attached. In fact, each storage device relates in an identical fashion to either of the systems, with the exception of the fact that signal transmission time will be longer between SYSTEM TWO and storage 1A than it will be between SYSTEM ONE and storage 1A, etc. Each of the storage devices 1A, 1B as used herein, are identical to the storage devices disclosed in said copending application with two exceptions: the first exception is that additional storage accessing controls are provided for each of the storage units as illustrated in FIG. 2; the second difference is that the storage device adapted for use in a shared system in accordance with the present invention must either have a storage protection apparatus (FIG. 876 of said copending application) for each *half* of each storage device (rather than one for each storage device as in said copending application), or the storage protection devices must be eliminated from this embodiment; as an alternative, additional busy controls may be provided so that no referencing can be had without taking into account whether the single storage protection device (such as for storage 1A) might be busy with respect to the other half of the storage (such as the even half of 1AE) even though a reference was being initiated to the opposite half (such as the odd half, 1AO); in any event, the handling of the storage protection apparatus with respect to any storage device is not germane to the present invention, and any method of accommodating (or eliminating) storage protection with respect to the usage of the present invention is left to the skill of the art.

Figure 3:
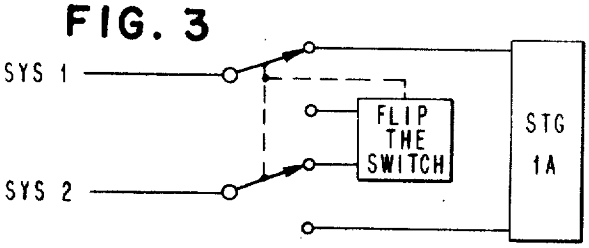
FIG. 3 is a simplified conceptual illustration of the basic premise of the present invention.

Referring briefly to FIG. 3, the present invention works on the basic theory that if SYSTEM ONE is requesting storage, and the switching arrangement has connected SYSTEM ONE in a preferential manner with that particular storage, then the request will be transmitted from the system to the storage. On the other hand, as illustrated in FIG. 3, if SYSTEM TWO makes a request for storage, but the storage is allocated at the time to SYSTEM ONE, then this request will instead cause a transfer of preference from SYSTEM ONE to SYSTEM TWO so that the request can later be made. In other words, if a requesting system is connected. the request is transferred to storage; if the system making the request is not then connected, its request is first used to flip the switch so that the request can be made, following which the request is actually honored.

Figure 2:
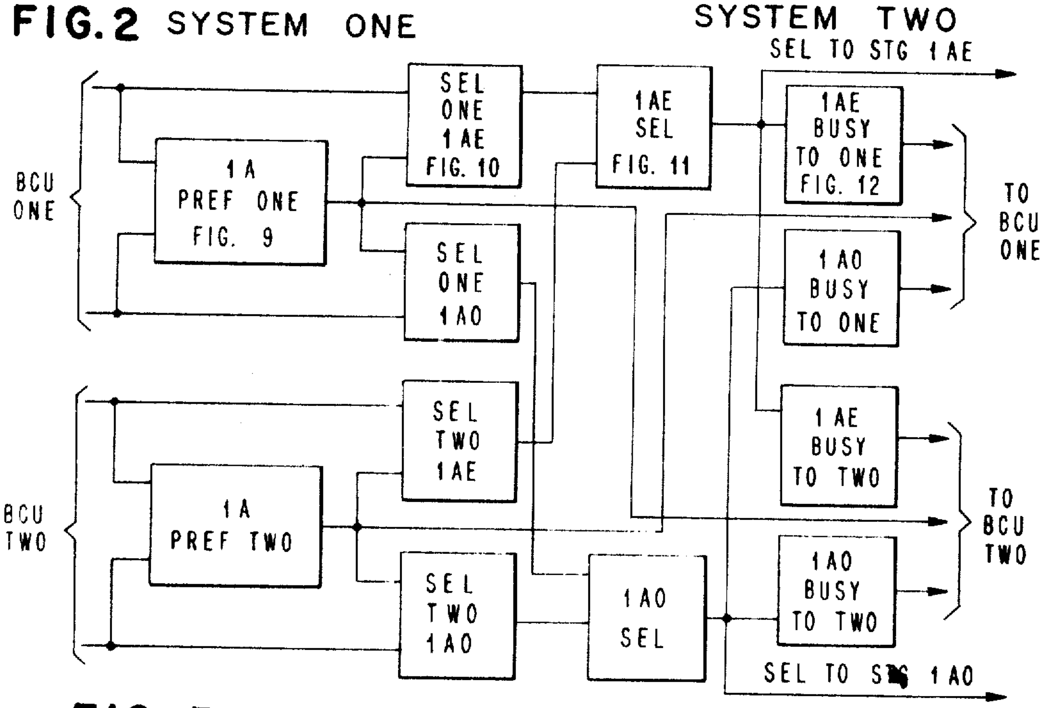
FIG. 2 is a simplified schematic block diagram of a storage access control apparatus in accordance with the present invention for utilization in a multi-system configuration as shown in FIG. 1.

As shown in FIGS. 1 and 2, the storage accessing controls, which are provided in each storage device, control whether the related storage device is currently considered to be preferred by SYSTEM ONE or preferred by SYSTEM TWO. Each storage device (1A, 1B) has its own storage accessing control, in accordance with the present invention. The storage accessing controls comprise the hardware shown schematically in FIG. 2; in other words, storage 1A has the equipment shown in FIG. 2, and storage 1B has a like set of hardware equivalent to that shown in FIG. 2.

Because of the large amount of circuits eliminated from FIG. 2 for simplicity, the operation of the circuit of FIG. 2 will not be apparent merely from observation thereof. However, as an incident of the understanding of the detailed block diagrams, the layout of the storage accessing controls should be first understood. In FIG. 2, the controls are broken down into those that relate to SYSTEM ONE and SYSTEM TWO, those that relate to the even half of storage (1AE), those that relate to the odd half of storage (1AO), as well as those that relate to the combination of a particular system with a particular storage. Specifically, the various portions of the circuits are related to the particular functions involved. For instance, a storage device might be busy to one system because the other system is currently preferred as to that storage device, or it might be busy to a system because the particular device (such as storage 1AE, or storage 1BO) happens to actually be busy at the moment, even though the requesting BCU does have preference with respect to that storage device: in the latter case, this would be due to a previous interleaved request from the same system.

As is described in detail hereinafter, the basic theory is that preference of either storage device may be established with respect to either system, by setting an appropriate bistable device, such as a trigger or a latch. The trigger or latch setting is utilized within the storage accessing controls of the particular storage device to assist in controlling that storage device, but more particularly, it is utilized to *prevent* accessing from the *other* system at the time that preference is set for a first system. The philosophy within the bus control units, for determining whether or not a particular BCU can access a given storage device, is that, if the storage device is busy, then the BCU will not access it directly, but if being busy is due to the fact that the particular storage device is preferred by the other system, then a request will be made which is interpreted (at the storage accessing controls of the requested storage device) as an indication that preference is to be switched to the previously un-preferred requesting system. If, on the other hand, a particular storage device is busy, but that storage device is not preferred by the other system, then this will just prevent any reference to that storage device until that storage device becomes nonbusy.

It should be noted that a device may actually be busy (that is, within a current reference from the other system) and the storage device might be preferred by the other system also; even in this case, however, the initial attempt to request storage by the non-preferred system will be interpreted by that storage as a request to transfer preference from the other BCU to the requesting BCU, so that, when the storage device finally completes its current cycle, it will be available to the requesting BCU.

A basic factor in the operation of the present invention is the manner in which each bus control unit generates a select signal for a storage device in either one of two different ways, in dependence upon whether the storage device is available, or not; also, if the storage device is busy, but not due to the other system being preferred, then no selection signal is generated. Inherent in the environmental system of said copending application is the fact that any request for storage, once made, will continue to be presented until that request is honored. Thus, in the embodiment of the present invention, a request which is initially rejected because the other system is preferred will continue to be presented, so that, after the preference circuits have been switched over (so the requesting system is now preferred), the request will then pass through the circuits of the BCU in such a fashion as to grant the storage accessing operation. In the case when the other system is initially preferred, then the select signal sent from the BCU of the requesting system is generated by a "request" type signal from either an input/output channel or a CPU of the requesting system. The "request" type signal is utilized in the bus control unit to generate a select signal which is sent to the storage device, but because the select signal is not transmitted internally of the BCU, it does not get an indication that a selection of storage is being made. When this select signal reaches the storage unit, it will cause the storage allocation circuits to reverse themselves (as illustrated in FIG. 3), so that the requesting system may then be granted a storage request.

In the case where the system making a request does have preference, then a "select" type signal is used to generate the storage selection signal which is sent to the storage unit, and this selection signal is also transmitted within the BCU to cause the entire storage accessing process to occur.

In all of the figures herein, references at the extreme right and left hand sides of the figures indicate figures from which signals come and figures to which signals go. Figures which are enclosed in a *circle* indicate that the signal comes from a circuit similar to the circuit shown in the figure corresponding to that figure number, but relating to the *other system*; figure numbers enclosed within a *square* indicate that the signal comes from a circuit similar to the stated figure, but for a different *storage unit*; figure numbers in *parentheses* relate to figures *within the environmental system* described in said copending application; figures which are *not enclosed* refer directly to *figures herein.*

Figure 4:
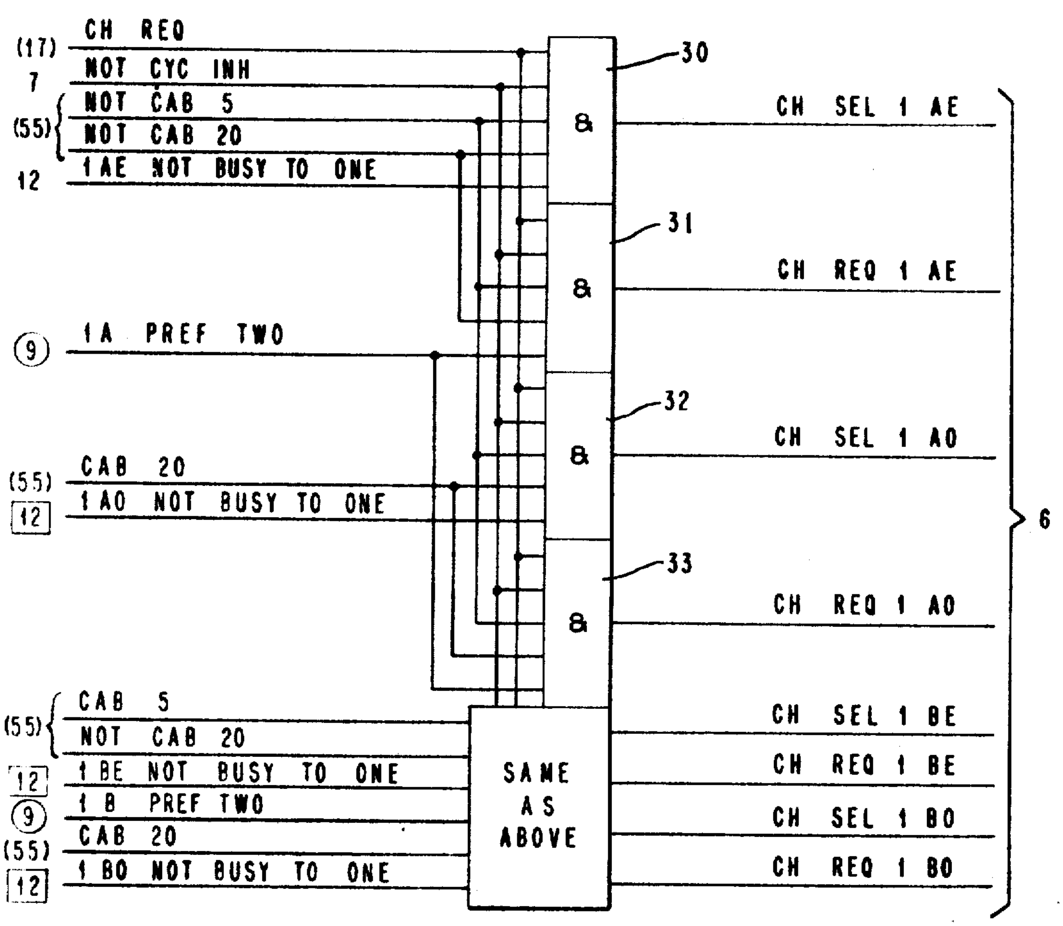
FIG. 4 is a schematic block diagram of channel select/request apparatus which is utilized in a bus control unit adapted to handle the sharing system of the present invention.
Figure 4:
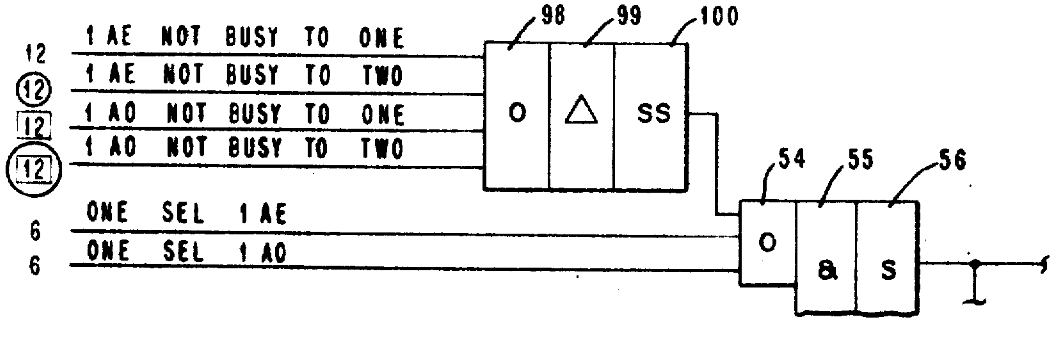

In FIG. 4 is shown modifications to the circuitry of FIG. 18 of the embodiment of an environmental system illustrated in said copending application. The modifications in FIG. 4 herein relate to two differences in the present embodiment: the first difference is that the circuit of FIG. 4 can generate either "select" or "request" type signals; the second difference is that within the present embodiment, a channel request may be directed to any one of four different storage units (1AE, 1AO, 1BE, 1BO), in contrast with merely even or odd selection as shown in FIG. 18 of said environmental system. The matter which is shown at the bottom of FIG. 18 in said copending application is identical with an embodiment consistent with the present invention, with the exception of the fact that the OR circuit 3 (in FIG. 18) will have all four "select" signals (generated in FIG. 4 herein) applied thereto.

Referring to FIG. 4, a pair of AND circuits 30, 31; 32, 33; etc., is provided for each storage device (1AE, 1AO, 1BE, 1BO). The AND circuits 30, 32 generate "select" type signals in the case where the corresponding storage device is not busy to that system, and the AND circuits 31, 33 generate "request" signals in the case where the other system (in the example shown, SYSTEM TWO) is preferred. Other inputs to these AND circuits are described in detail in Section 6 of said copending application. Each of the AND circuits is responsive only when there is a channel request signal on the CH REQ line concurrently with the absence of inhibition due to the maximum bus control unit cycling rate, as indicated by the presence of a signal on the NOT CYC INH line. The AND circuit 30 specifies storage unit 1AE, in response to the absence of bit 5 (which designates storage unit 1A) on the channel address bus (CAB) concurrently with the absence of bit 20 (which indicates an even storage location) on the channel address bus. Addressing considerations are described in detail in Section 6.2.2 of said copending application. Addressing is precisely the same in this embodiment, the only difference being that four-way interleaved operation is possible herein, rather than two-way interleaved operation as described therein. The AND circuit 31 responds to the same signals as the AND circuit 30 except for the fact that the AND circuit 31 responds to a signal indicating that SYSTEM TWO is preferred, said signal appearing on the 1A PREF TWO line, in contrast with the AND circuit 30 responding when the particular storage unit is not busy as indicated by a signal on the 1AE NOT BUSY TO ONE line. Thus, whenever the storage device is not busy, the AND circuit 30 will generate a selection signal therefore on the CH SEL 1AE line. On the other hand, whether or not the storage device is actually busy, if the storage device is preferred by the opposite system, then the AND circuit 31 will generate a requesting signal on the CH REQ 1AE line. The AND circuits 32 and 33 are similar to AND circuits 30 and 31 except they relate to the odd half of storage unit 1A due to the fact that they respond to bit 20 of the channel address bus, indicating an odd storage location. Circuitry identical to the AND circuits 30–33 is also provided (though not illustrated in detail) for storage unit 1B, the only difference being that these circuits respond to bit 5 of the channel address bus, rather than to the absence thereof.

Figure 5:
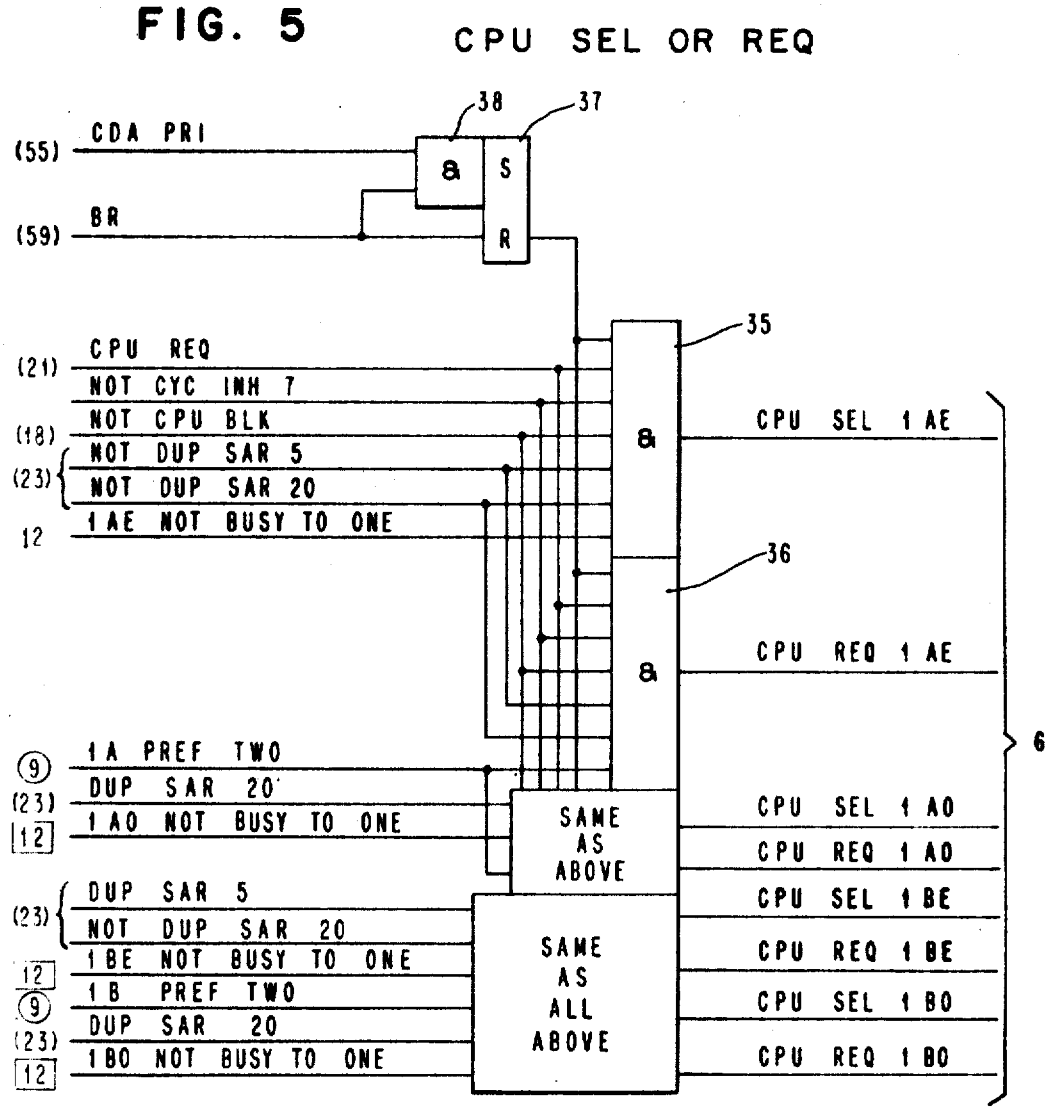
FIG. 5 is a schematic block diagram of a CPU select/request circuit of a bus control unit adapted to utilize the sharing system of the present invention.

In FIG. 5 are circuits similar to those shown in FIG. 4, the circuits of FIG. 5 controlling storage selections and requests which are made by the central processing unit (CPU). The AND circuits 35 and 36 respond to the busy and preferred signals (just as do the AND circuits 30–33 in FIG. 4), but respond to address bits 5 and 20 of the duplicate storage address register (DUP SAR) rather than to the channel address bus. Additionally, the CPU must not be blocked from utilizing the bus control unit due to channel operations as indiciated by a signal on the NOT CPU BLK line. Furthermore, the channels must not be indicating a need to pre-empt the storage devices for exclusive use by the channels; this is controlled by a latch 37 which is set by an AND circuit 38 whenever priority to the channels is indicated by a signal on the CDA PRI line under the control of a running B-time clock pulse (BR), B-time being the third quarter of a machine cycle; whenever the latch 37 is set, then there will be no signal to enable the AND circuits 35, 36, etc., to operate. After a B-time of any cycle in which there has been no signal on the CDA PRI line, the latch 37 will be reset so that a signal from the reset side will permit operation of the AND circuits in FIG. 5. Notice that whenever a storage device is busy, it will *prevent* the generation of a "select" type signal, and whenever the other system is preferred, it will *cause* the generation of a "request" type signal. This operation is the same as in the channel selection circuits of FIG. 4. Details relating to the CDA PRI and NOT CPU BLK lines may be found in Section 6 of said copending application, they have no bearing on the subject of the present invention. It should be noted that these signals are included herein merely to completely illustrate how the embodiment of said copending application may be modified in accordance with the present invention.

Figure 6:
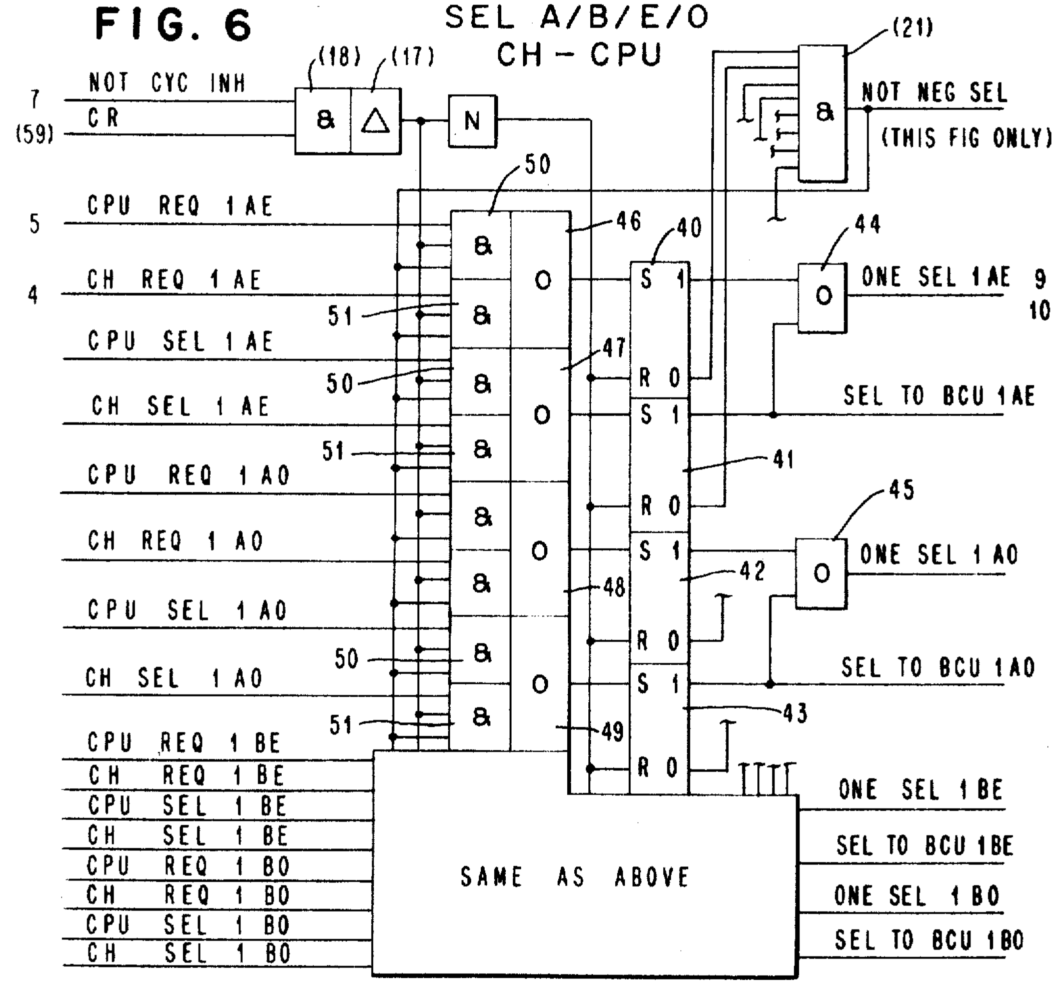
FIG. 6 is a schematic block diagram of the BCU select circuits of a bus control unit adapted for use with a sharing system of the present invention.

The signals generated in the circuitry of FIGS. 4 and 5 are applied to the circuit shown in FIG. 6 so as to generate storage selection signals. Depending upon whether the storage selection signal is to be used to merely ask a storage device for preference or to actually make a storage reference (in the case where the storage device has already granted preference to the system), either one of a pair of latches 40, 41; 42, 43 may be set for each of the storage devices. The latches 40, 42 supply signals to corresponding OR circuits 44, 45 which send selection signals directly to storage on the ONE SEL 1AE and ONE SEL 1AO lines, respectively. The output of the latches 40, 42 is not utilized within the bus control unit, and therefore the bus control unit does not recognize signals therefrom as indicative of an actual storage reference. On the other hand, if the storage request is made at a time when the particular system has preference with the desired storage unit, then the latch 41 or the latch 43 will generate signals for the respective OR circuits 44, 45 so as to cause a storage reference; in this case, the output of the latches 41, 43 are also applied to the difference circuits within the BCU via signals on the SEL TO BCU 1AE and SEL TO BCU 1AO lines, respectively. Each of the latches 40–43 is set by a corresponding OR circuit 46–49 which in turn is responsive to related pairs of AND circuits 50, 51. The AND circuits 50 respond to signals corresponding to CPU storage requests, and the AND circuits 51 respond to signals corresponding to channel requests. The signals applied to the AND circuits 50, 51 are those signals generated in the circuitry of FIGS. 4 and 5 respectively. Signals from FIGS. 4 and 5 which are of the "request" type are applied to those AND circuits 50, 51 which correspond to OR circuits 46 and 48, and signals from FIGS. 4 and 5 which are of the "select" type are applied to those AND circuits 50, 51 which correspond to OR circuits 47, 49. Although eliminated for simplicity, all of the circuitry 40–51 which has been described with reference to FIG. 6 is duplicated for storage units 1BE and 1BO.

Taking FIGS. 4, 5, and 6 together, it can now be seen that any request for a non-busy storage unit will cause a signal of the "select" type from either FIG. 4 or FIG. 5, and this signal will applied to an AND circuit which corresponds to one of the OR circuits 47, 49 so as to set one of the latches 41, 43 thereby to generate not only a storage selection signal (such as ONE SEL 1AE) but also to generate an internal selection signal for the BCU (such as SEL TO BCU 1AE). On the other hand, any storage request applied to FIG. 4 or 5 which is matched by a signal indicating that SYSTEM TWO is preferred (SYSTEM TWO being the *other* system in the example shown in these drawings), will cause a signal of the request type to be applied to one of the AND circuits 50, 51 (FIG. 6) which corresponds to an OR circuit 46, 48 so as to set a latch 40, 42 that will supply a select signal only to the storage unit and not to the BCU. Such a select signal is used in the storage unit to reverse preference from the other system to this system so that, eventually, a not busy condition will be found in FIGS. 4 and 5 so as to permit a full storage reference to take place. This action is one of the major features of the present invention: the ability to use a single select signal to a storage device either as a storage reference requests or as a request to reverse preference from one system to the other. Of course, in order for the select signal to perform these dual functions, it is necessary for circuitry within the storage devices to properly respond to these signals, as is described hereinafter. The circuitry shown in FIG. 6 is modified from FIG. 27 of said copending application.

Figure 7:
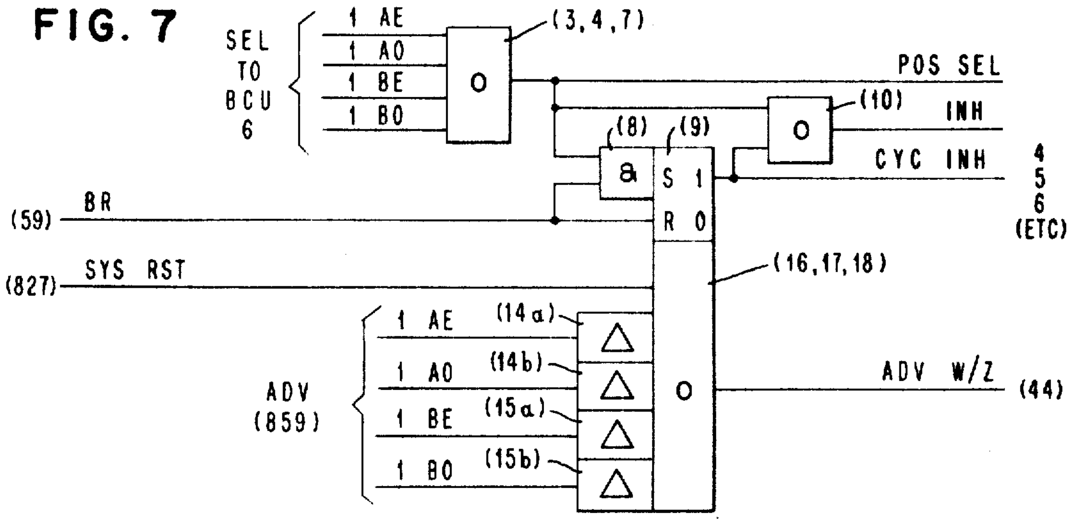
FIG. 7 is a schematic block diagram of positive select, inhibit, and advance circuits adapted for use in a BCU capable of connection to a sharing storage control device in accordance with the present invention.

The circuitry of FIG. 7 is a variation of that shown in FIG. 28 in said copending application, but the busy circuits (in the center of FIG. 28 in said copending application) are eliminated herein due to the fact that busy control is supplied by each individual storage unit in the embodiment of the present invention. A description of these circuits is given in Section 6.1.4.2 of said copending application. In FIG. 7, each of the elements are given reference numerals in parentheses which identify corresponding hardware of FIG. 28 in said copending application.

Figure 8:
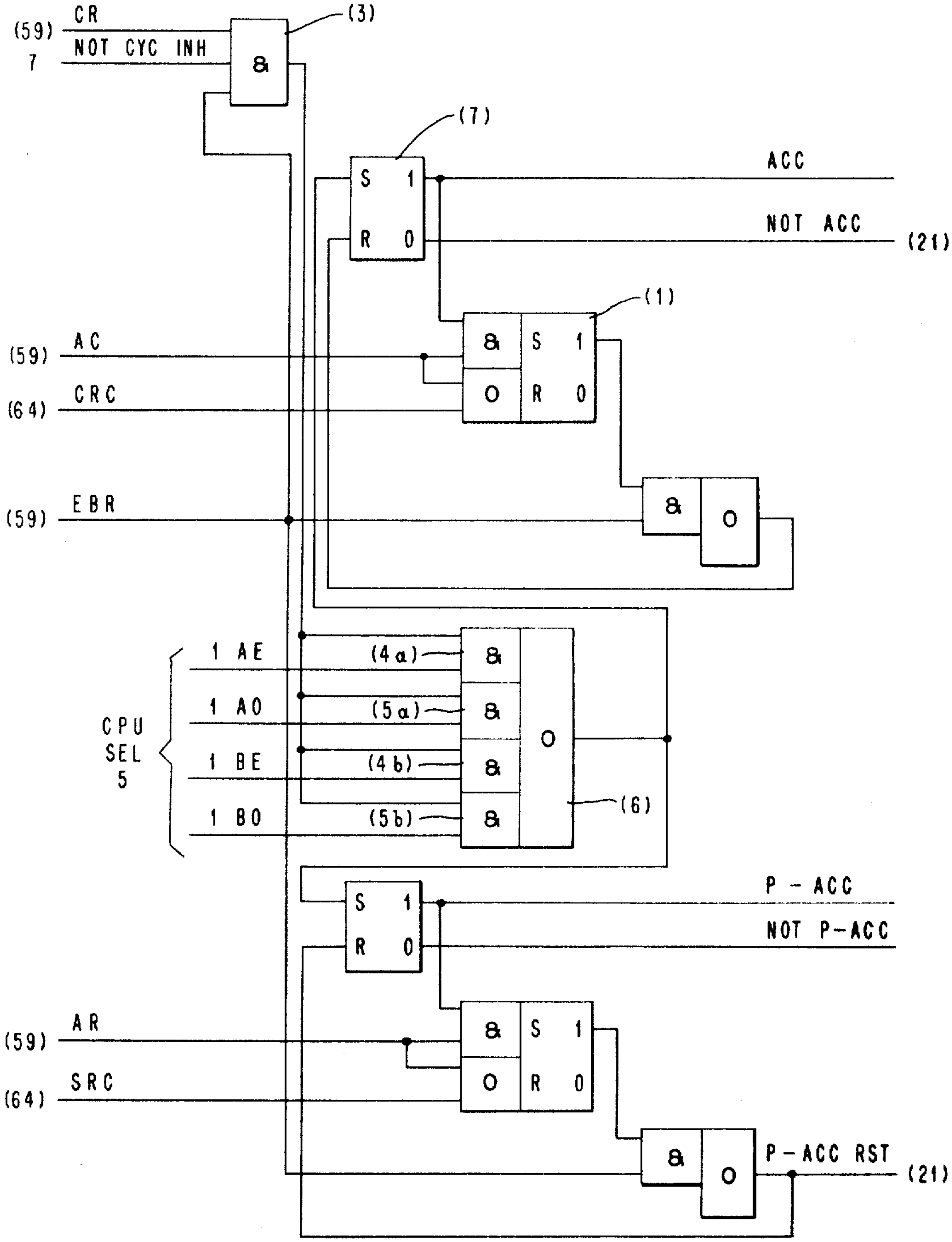
FIG. 8 is a schematic block diagram of an accept circuit for a bus control unit adapted for use with the sharing system of the present invention.

FIG. 8 herein is merely an adaptation of FIG. 29 of said copending application, the differences being that CPU select signals for all four storage units, rather than just for even and odd storage unit pairs, are provided herein. This circuitry is described in detail in Section 6.1.4.3 of said copending application, the operation not being germain to the present invention, other than to illustrate a complete BCU.

Figure 9:
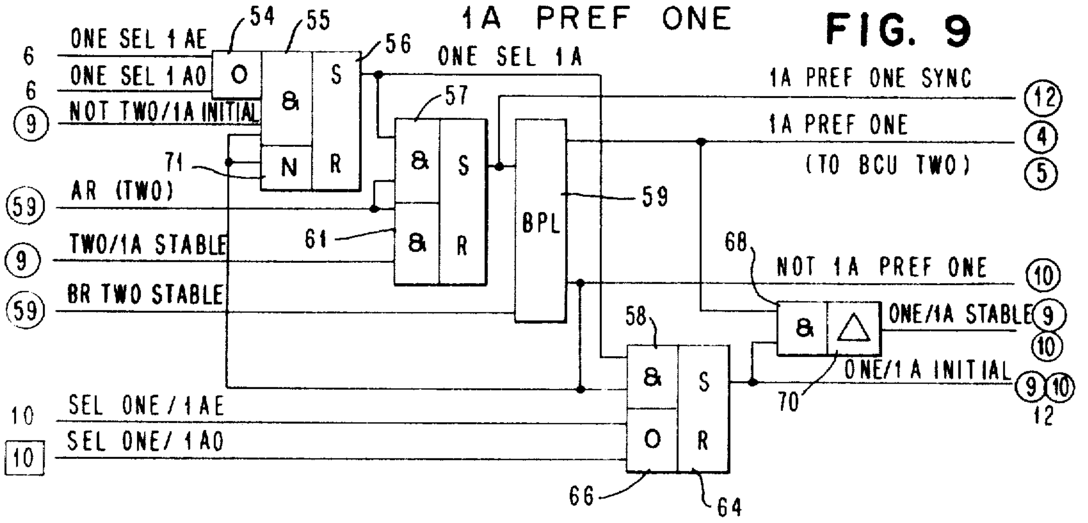
FIG. 9 is a detailed schematic block diagram of the preference circuit illustrated in FIG. 2.
Figure 10:
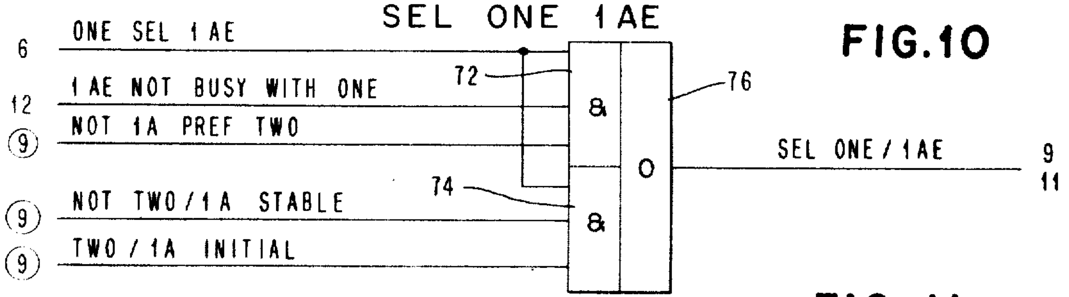
FIG. 10 is a detailed schematic block diagram of the storage selection circuit illustrated in FIG. 2.
Figure 11:
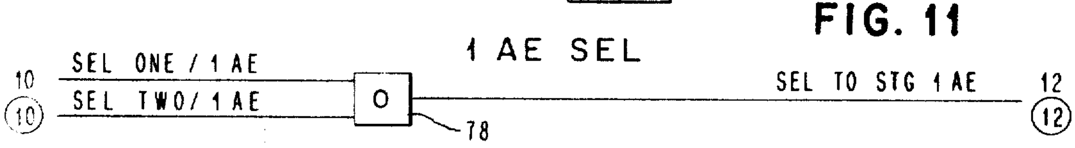
FIG. 11 is a detailed schematic block diagram of the select circuit shown in FIG. 2.
Figure 12:
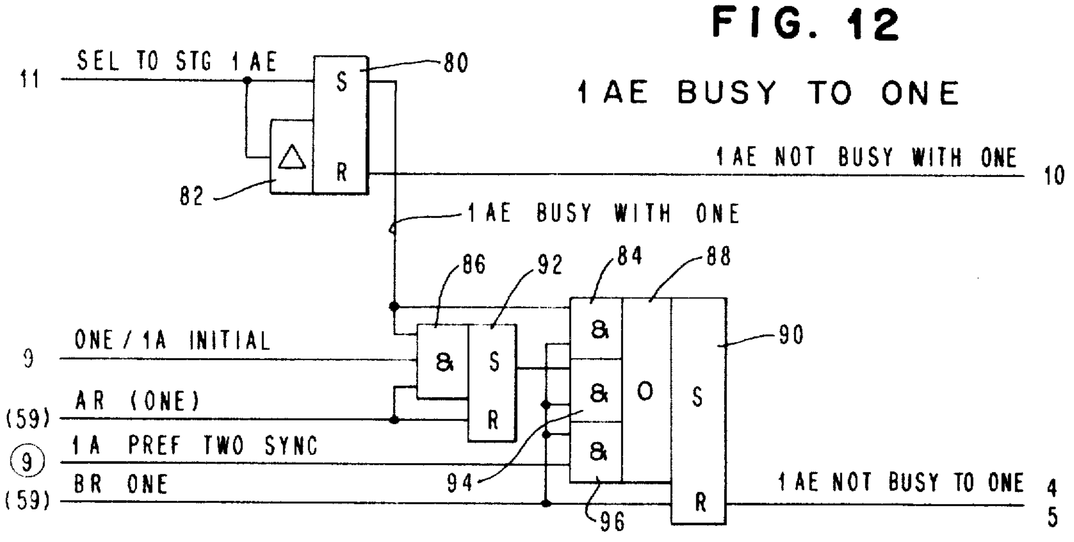
FIG. 12 is a detailed schematic block diagram of the busy circuit shown in FIG. 2.

The circuits within the storage devices for controlling preference and busy conditions are illustrated in FIGS. 9–12. These figures include the details of the circuitry of FIG. 2. In brief, the circuit of FIG. 9 controls whether or not SYSTEM ONE has preference with respect to storage frame 1A, including storage unit 1AE and storage unit 1AO. Although storage units 1AE and 1AO are independently busy or not, preference of both of these storage devices for either SYSTEM ONE or SYSTEM TWO is maintained on the basis of both pairs of storage units (1AE and 1AO). Thus, the present embodiment has a two-way preference system (storage frame 1A can either prefer SYSTEM ONE or SYSTEM TWO), coupled with a four-way busy system (1AE and 1AO may be busy independently with either SYSTEM ONE or SYSTEM TWO). However, four-way preference and/or two-way busy control may be provided, if desired. FIG. 10 includes a circuit that allows a selection signal to actually be operative within a storage unit in the case where SYSTEM ONE is not blocked by preference to SYSTEM TWO. FIG. 11 combines the signal to FIG. 10 with a signal from a corresponding circuit relating to SYSTEM TWO. Thus FIGS. 9–11 control actually accessing a storage device and the setting of preference for SYSTEM ONE with respect to the storage device. FIG. 12 is the busy control within the storage device, and it responds to the preference conditions and selection signals so as to indicate when the storage device is actually busy or when it is busy with respect to SYSTEM ONE due to the lack of preference for SYSTEM ONE.

Throughout the description that follows, it should be understood that the circuitry of FIGS. 9–12 is concerned with operating a pair of systems and four storage devices in a nearly non-synchronous manner, and operating these at as high a rate of speed as possible. In other words, it is not a matter of having a simple trigger to allocate a storage device to one system or to the other because it takes time for each system to know whether or not it is preferred with respect to a particular storage device, and if SYSTEM TWO is to obtain preference which originally resides with SYSTEM ONE, SYSTEM ONE might send a signal to storage just at the time that SYSTEM TWO begins to take over preference from SYSTEM ONE. These timing relationships are accounted for in the circuits of FIGS. 9–12.

Referring now to FIG. 9, a selection signal from FIG. 6, for either the even or odd unit of storage frame 1A will cause an OR circuit 54 to pass a signal to an AND circuit 55. The AND circuit 55 is also responsive to a signal on a NOT TWO/1A INITIAL line, which indicates that storage unit 1A is not in the initial process of changing preference to SYSTEM TWO. The NOT TWO/1A INITIAL signal is developed in a circuit (relating to SYSTEM TWO) which is equivalent to the circuit being described in FIG. 9 (which relates to SYSTEM ONE) The AND circuit 55 sets a latch 56, the output of which is applied to a pair of AND circuits 57, 58. The AND circuit 58 will either not operate or will operate immediately, in dependence upon whether the preference latch for SYSTEM ONE has previously been set or not. This is a bipolar latch 59, the characteristics of which are such that it will follow, on a cyclic basis, the setting of a latch 60: that is, in any cycle in which the latch 60 is set at A-time, the bipolar latch 59 will be allowed to set at the following B-time; in any cycle in which the latch 60 is reset at A-time, the bipolar latch 59 will be reset at B-time. The timing of these two latches is controlled by running clock signals from SYSTEM TWO, the signals appearing respectively on the AR(TWO) and BR(TWO) lines. SYSTEM TWO timing is used since the most critical function of this latch is to allow "reject" type signals (as in FIGS. 4 and 5) within SYSTEM TWO. The operation of these circuits is described in detail in Section 5 of said copending application, and timing considerations of said environmental system are described throughout Section 6 and in Section 7 of said copending application. In any event, for every select signal (except when SYSTEM TWO is initializing preference), the latch 56 will be set and will cause the AND circuit 57 to set the latch 60 at the following A-time of SYSTEM TWO. This synchronizes the setting of the latch 60 (and it is similar for the latch 59) with SYSTEM TWO. The latch 60 will remain in a set condition forever unless SYSTEM TWO takes preference away from SYSTEM ONE. This being so, the latch 59 will follow the latch 60 in every cycle and therefore it will remain in the set condition for all time until a stable preference condition from SYSTEM TWO is received at an AND circuit 61 on the TWO/1A STABLE line. If the latch 60 has not been reset by the AND circuit 61, then the AND circuit 57 merely redundantly attempts to set an already set latch in response to the setting of the latch 56 upon the receipt of select signals through the OR circuit 54.

In the case where SYSTEM TWO initially has preference, select signals received at the OR circuit 54 will cause a setting of the latch 56 unless SYSTEM TWO has just achieved preference, in which case the AND circuit 55 is blocked and nothing happens in FIG. 9. In a steady state condition where SYSTEM TWO has had preference for a sufficient length of time to become stable, the output of the latch 56 will combine with the OFF side of the latch 59 so as to cause the AND circuit 58 to set a latch 64. The latch 64 defines the operation as being the initial setting of preference for SYSTEM ONE by generating a signal on the ONE/1A INITIAL line. This initial condition will last until an OR circuit 66 resets the latch 64 in response to the selection of either the even or odd unit of storage frame 1A, in response to a signal on either the SEL ONE/1AE or SEL ONE/1AO lines. As is described hereinafter, an input to the OR circuit 66 indicates that the circuitry of FIG. 10 is successful in supplying a selection signal which will cause the circuit of FIG. 11 to actually start a storage reference operation within the storage circuitry. Thus, the initial latch 64 is set whenever SYSTEM ONE has not had preference (due to the offside of the bipolar latch 59) when the select latch 56 is set; and the initial latch 64 will remain set, thereby defining an initial preference condition, until the first successful storage selection signal passes through the circuitry of FIG. 10.

The output of the latch 64 is applied to an AND circuit 68, the output of which is passed through a delay unit 70 (of any well-known type) onto the ONE/1A STABLE line; this signal indicates that the preference latch 59 has been set, concurrently with the initial trigger 64 being set, for a sufficient length of time (which is achieved by establishing a proper delay value in the delay unit 70) so that a last-minute request from SYSTEM TWO has had enough time to actually be received by storage device 1A. In other words, after SYSTEM ONE begins to be granted preference (by setting of the bipolar latch 59 and the initial latch 64), a certain amount of time is allowed for last-minute requests from SYSTEM TWO to be processed, after which a signal appears at the output of the delay unit 70. The selection signals which operate the OR circuit 54 in FIG. 9 are also applied to a pair of AND circuits 72, 74 (and corresponding AND circuits for storage unit 1AO) in FIG. 10. Either of these AND circuits can operate an OR circuit 76 so as to provide a selection signal from SYSTEM ONE for storage unit 1AE on the SEL ONE/1AE line. The AND circuit 72 handles a normal case, where SYSTEM TWO does not have preference (as indicated by a signal on the NOT 1A PREF TWO line), and storage unit 1AE is not busy (as indicated by a signal on the 1AE NOT BUSY WITH ONE line). The AND circuit 74 relates to the case where, although the SYSTEM TWO preference latch may be set, it has not been set sufficiently long to consider the condition stable, and a last-minute request from the BCU of SYSTEM ONE must be honored. This is indicated by the fact that SYSTEM TWO is initializing but has not yet become stable, which provides signals on the NOT TWO/1A STABLE and TWO/1A INITIAL lines. Notice that the AND circuit 72 responds to the complement of the signal which tells SYSTEM ONE that SYSTEM TWO has preference. Thus, in FIGS. 4 and 5 herein, if SYSTEM TWO has preference, this causes a "request" type signal to be generated in FIGS. 4 and 5, rather than a "select" type signal; similarly, if SYSTEM TWO does not have preference, then there will be a signal on the NOT 1A PREF TWO line so that the AND circuit 72 will operate. The signal on the 1AE NOT BUSY WITH ONE line will be present only if SYSTEM TWO does not have preference with respect to unit 1A; if SYSTEM ONE does have preference, a previous request to unit 1AE *cannot* be *still* outstanding. In other words, storage unit 1AE must, in fact, be not busy, and also must, in fact, not be allocated to SYSTEM TWO, in order for there to be a signal on the 1AE NOT BUSY WITH ONE line.

The need for the AND circuit 74 is because, in storage unit 1A, when the SYSTEM TWO preference latch is set, the fact of it being set will take some time to propagate back to SYSTEM ONE; therefore, the fact that SYSTEM TWO now has preference will not be recognized in FIGS. 4 and 5 for some length of time following the setting of the SYSTEM TWO preference latch (similar to latch 59). The setting of a latch similar to latch 60 for SYSTEM TWO will have an effect on the busy status of the storage unit, but this will also take some time to propagate back to SYSTEM ONE; during the time that the establishment of preference for SYSTEM TWO is being communicated to SYSTEM ONE, SYSTEM ONE may send a last-minute request since it does not yet know that it is losing preference: this request will be received in the storage unit *after* the setting of the preference trigger to SYSTEM TWO. However, in order to insure that any requests which safely pass through the circuitry of FIGS. 4–6 of SYSTEM ONE will actually be honored, the last-chance conditions are accounted for in the circuitry of FIG. 10 (as well as in FIG. 12, as is described hereinafter).

The output of the OR circuit 76 in FIG. 10 is applied to an OR circuit 66 in FIG. 9 so as to end the initial condition whenever the request being recognized by the circuit of FIG. 10 is the first, or initial request, after changing preference to SYSTEM ONE. The signal out of the OR circuit 76 in FIG. 10 is also applied to an OR circuit 78 in FIG. 11, which recognizes selection signals for storage unit 1AE, both from SYSTEM ONE and from SYSTEM TWO. These provide the actual selection signal which is operative to initiate storage unit operation within the storage circuitry, corresponding to the SEL TO STG signals which are provided at the output of FIG. 27 of said copending application, which signals are utilized in the storage circuitry shown in FIGS. 861, 862, 871, and 876 of said copending application. Thus, FIGS. 10 and 11 are starting circuits.

The output of the OR circuit 78 in FIG. 11 is also applied to a latch 80 and a delay unit 82 in FIG. 12, the delay unit 82 causing the resetting of the latch 80 after a definite length of time following the setting of latch 80. The time of the delay unit 82 is chosen to correspond with the actual amount of time required by storage unit 1AE to get through a storage accessing operation sufficiently to again be considered to be not busy, so that future requests from a related system may begin to be processed for it. In other words, the timing of the delay unit 82 is coextensive with the busy time of storage unit 1AE. Of course, as is illustrated in FIG. 2, each storage unit has a corresponding delay unit for each system, and the delay time of each unti is set to correspond with the busy time of the respective storage unit, taking into account the propagation time for the related system. Thus, the latch 80 defines, when set, an actual busy condition with respect to the related storage unit (storage unit 1AE in FIG. 12). Note that the latch 80 may be set by a request from SYSTEM TWO, since it is fed by the output of FIG. 11. When the latch 80 is set, indicating that the storage unit is in fact being used, it sends a signal to a pair of AND circuits 84, 86. The AND circuit 84 causes an OR circuit 88 to set a latch 90, which indicates that this storage device is busy with respect to SYSTEM ONE. Thus the AND circuit 84 relates to an actual busy condition of the storage unit insofar as setting the latch 90 is concerned. The AND circuit 86 in turn operates a latch 92 so as to remember that a last-minute request has been made by SYSTEM ONE, in the case where preference is being initially transferred to SYSTEM ONE. In other words, a request which passes through the AND circuit 74 (in FIG. 10) will not only cause (1) the operation of the AND circuit 84 (in FIG. 12) so as to set the latch 90 during each cycle in which the busy trigger 80 remains set, but will also cause (2) the AND circuit 86 and latch 92 to permit an AND circuit 94 to set the latch 90 in one *additional* cycle, following and resetting of the latch 80. This maintains the busy status in FIGS. 4 and 5 for one additional cycle in order to ensure that the resetting of the latch 90 can be synchronized to the timing of SYSTEM ONE without any chance of an undefinable race condition existing; a race condition could otherwise exist since storage 1AE could become non-busy from a request initiated by SYSTEM TWO at a time which undefined in comparison with B-time of SYSTEM ONE. Anytime that SYSTEM TWO has preference, or will get preference within a half-cycle, there is signal on the 1A PREF TWO SYNC line which causes an AND circuit 96 to set the latch 90. The AND circuit 96 therefore represents the steady state busy condition whereby storage unit 1AE is busy to SYSTEM ONE because storage frame 1A is currently allocated to SYSTEM TWO. By utilizing the signal output of a latch corresponding to latch 60 in FIG. 9 as an input to the AND circuit 96 in FIG. 12 (rather than the output of a preference latch corresponding to 59) the AND circuit 96 will operate a half-cycle sooner (at A-time rather than at B-time) and thereby ensure the setting of the latch 90 so as to indicate to SYSTEM ONE that storage unit 1AE is busy to SYSTEM ONE as soon as the preference SYNC trigger 60 is set. Thus the latch 90 will become set at the same time as the SYSTEM TWO preference latch (corresponding to latch 59, in FIG. 9) whenever the SYSTEM TWO preference synchronizing trigger (coresponding to trigger 60 in FIG. 9) is set for storage frame 1A.

Summarizing, the latch 90 will be set by AND circuit 84 whenever storage unit 1AE is actually being used either by SYSTEM ONE or SYSTEM TWO. It may also be set one cycle later by AND circuit 94 and latch 92 whenever storage unit 1AE has just become non-busy with respect to SYSTEM TWO but SYSTEM ONE is just gaining initial preference. Additionally, the latch 90 may be set by the AND circuit 96 whenever SYSTEM TWO is preferred or is within a half-cycle of being preferred. The latch 90 represents "availability," including both busy and non-preferred conditions.

Notice that in the case where SYSTEM TWO is being initially granted preference after SYSTEM ONE has had preference, a last-minute selection signal from SYSTEM ONE for storage unit 1AE or storage unit 1AO will not operate the AND circuit 55 in FIG. 9, and therefore will not set the preference circuitry of FIG. 9, but that same selection signal can pass through the AND circuit 74 in FIG. 10 so as to establish an actual last-minute storage reference operation. Due to the time delays between the storage unit and the different systems, it would otherwise be possible for SYSTEM TWO to become stable, thereby resetting the SYSTEM ONE preference synchronization trigger 60; the bipolar latch 59 would be turned off, sending a signal back to reset the trigger 56 by means of an inverter 71, followed by a last-minute selection signal from SYSTEM ONE causing the latch to again be set. This is prevented by using the NOT TWO/1A INITIAL line to prevent the AND circuit 55 from operating once SYSTEM TWO is initialized with respect to storage frame 1A; specifically, since TWO/1A INITIAL comes up very quickly when SYSTEM TWO has not had preference, it immediately blocks any setting of latch 55. In order to ensure that some known condition exists when either system is turned on, a powering-up line from either system may be used to force all preference to one system initially.

Thus there has been described an apparatus within which two different systems may send signals to two different storage frames, each of which has independent halves that may be operated in an interleaved fashion so long as a system is not precluded from reaching the particular storage frame due to preference being allocated to the other system. The communication from a system to each of the storage units is by means of a single select signal; however, since the select signal may be generated by either "select" or "request" type signals within the bus control unit of the requesting system, and since the select signals operate independently within the storage frame to: (1) either change preference or not, and to (2) actually cause a storage reference operation or not, synchronization as between the storage units and the systems is greatly simplified.

Specifically, the circuits of FIG. 6 recognize the select and request outputs of FIGS. 4 and 5 differently, and the circuit of FIG. 9 may or may not operate even though the circuit of FIG. 10 may or may not operate, independently of FIG. 9, any time that there is an output from FIG. 6. This is the gist of the invention, which permits sophisticated operation between storage units and systems which are not tied together with complex interlocking circuitry. It should also be noted that the preference latch (59, FIG. 9) is operated in synchronism with the *opposite* system because it is utilized as a *permit* in the opposite system for generating "request" type signals (as in FIGS. 4 and 5); but the busy circuitry (as in FIG. 12) is synchronized with timing signals from its related system because the output of FIG. 12 is utilized in the *corresponding* system as an *inhibit* on the generating "select" type signals when a storage device is busy to that system. These sets of timing signals (FIG. 9, FIG. 12) represent the only synchronizing required between the various storage units and the bus control units of the respective systems, insofar as preference and selection is concerned.

The foregoing description is based on a showing of the details (FIGS. 4–12) of only one circuit of each type. With reference to FIGS. 1 and 2, however, it can be seen that FIG. 2 represents all of the circuitry for storage frame 1A, which controls the accessing by SYSTEM ONE and SYSTEM TWO of storage units 1AE and 1AO. A completely similar set of circuitry is required for storage frame 1B, which circuitry would correspond in all respects to that illustrated in FIG. 2. For storage frame 1A, FIG. 9 represents preference for SYSTEM ONE, and a similar set of hardware is to be provided for indicating preference to SYSTEM TWO with respect to storage frame 1A; four sets of equipment of the type illustrated in FIG. 10 are required, one for each half of the storage frame for each of the systems; two sets of equipment as illustrated in FIG. 11 are required, as well as four sets of equipment as illustrated in FIG. 12.

Since the last system to access a particular storage is likely to be the next one to do so, the foregoing embodiment is most likely to satisfy actual operating conditions. However, an alternative embodiment of the present invention utilizes all of the circuitry disclosed hereinbefore, but in addition provides, as an input to the OR circuit 54 (FIG. 9), a signal which is the combination of all busy latches (90) for the storage frame being off and a certain amount of delay to ensure that no last-minute requests are on the way. In FIG. 13, an OR circuit 98 senses that frame 1A is not busy, and after a delay (99), chosen to suit design of a particular system, will cause a single pulse out of a single shot (100), or other suitable circuit. This causes an input to the OR circuit 54, to force preference for Unit 1AE to SYSTEM ONE. Similar biasing may be used for other units and/or systems. Also, the AND circuit 55 could have an inhibit signal applied to it in a case where SYSTEM TWO needed to be assured of non-shared usage of Unit 1AE.

The great advantage of this invention, however, is that allocation of a unit to a system always works a hardship on the other system, and no planned scheme of allocation works well in all cases. The invention leaves allocation where the last usage put it, unless a request from the other system shows it should change. If both systems need back-to-back accessing of a unit, they will share the unit evenly in accordance with this invention.

If the ONE SEL 1AE line (and similar lines) were not the combined output of "request" and "select" type signals, and these were respectively applied to OR circuit 54 and AND circuit 72, then the AND circuit 55 would not need the OFF side of latch 59 and the AND circuit 72 would not need 1AE NOT BUSY WITH ONE; no other simplifications would result.

While the invention has been shown and described with respect to preferred embodiments thereof, it should be understood by those skilled in the art that the foregoing and other changes and omissions in the form and details thereof may be made therein without departing from the spirit and the scope of the invention, which is to be limited only as set forth in the following claims.

What is claimed is:

1. A data processing apparatus including a plurality of data processing systems and a related plurality of data responsive devices wherein each device may comprise one or more data-responsive units, wherein each system includes one or more unit addressing means where each said addressing means in each system specifies one of said units so that each system can specify any of said units, and wherein each unit includes storage reference means operative upon energization to select that unit when the unit has been specified by said addressing means, the combination comprising:

a plurality of preference means, one preference means for each of said devices, each preference means settable into a first state to generate a device preference signal to indicate preference of the related device for one of said systems;

a plurality of bistable means, each bistable means connected to a different one of said unit addressing means and operative to generate a unit selection signal when that connected one of said addressing means specifies one of said units; said plurality of bistable means including:

a first bistable group consisting of those bistable means connected to unit addressing means from a first system which specify units in a first device;

a second bistable group consisting of those bistable means connected to unit addressing means from a first system which specify units in a second device;

a third bistable group consisting of those bistable means connected to unit addressing means from a second system which specify units in a first device; and a fourth bistable group consisting of those bistable means connected to unit addressing means from a second system which specify units in a second device;

a plurality of first connecting means including;

first means connecting said first bistable group to a first one of said preference means for setting with a unit selection signal said first one into said first state;

second means connecting said second bistable group to a second one of said preference means for setting with a unit selection signal said second one into said first state;

third means connecting said third bistable group to a third one of said preference means for setting with a unit selection signal said third one into said first state;

fourth means connecting said fourth bistable group to a fourth one of said preference means for setting with a unit selection signal said fourth one into said first state;

a plurality of selection means including one in each system for each unit, each selection means in each system connected to a different one of said units and operative when energized to energize the storage reference means in the connected unit and thereby select that unit specified by said addressing means; said selection means including;

a first selection group connected to receive in coincidence a unit selection signal from said first bistable group and a device preference signal from said first preference means so as to energize the selection means connected to the unit specified by said addressing means;

a second selection group connected to receive in coincidence a unit selection signal from said second bistable group and a device preference signal from said second preference means so as to energize the selection means connected to the unit specified by said addressing means;

a third selection group connected to receive in coincidence a unit selection signal from said third bistable group and a device preference signal from said third preference means so as to energize the selection means connected to the unit specified by said addressing means; and a fourth selection group connected to receive in coincidence a unit selection signal from said bistable group and a device preference signal from said fourth preference means so as to energize the selection means connected to the unit specified by said addressing means.

2. For use with a plurality of data processing systems and a related plurality of data responsive devices, wherein each device may comprise one or more data-responsive units, the combination, comprising:

a plurality of groups of preference means, one group for each of said devices, each preference means settable into any of a plurality of states to indicate preference of the related device for any one of said systems;

a plurality of groups of availability indicators, each group relating to one of said units, each availability indicator in a group relating to one of said systems, each indicator settable into either one of two states, each indicating, when in a first state, that the related unit is available to the corresponding system, each of said availability means responsive to a corresponding one of said means to be set into a second one of said states when the related preference means indicates preference for other than the corresponding system;

at least one unit addressing means for each of said systems, each for specifying a selected one of said units;

a plurality of request initiating means, one for each of said addressing means;

a plurality of groups of first and second bistable means, one group for each of said request initiating means, each group including one of said first means and one of said second means for each of said units, each of said bistable means settable to generate a unit selection signal in response to the related request initiating means and to the related address means, each of said first means being set only when the related one of said availability means is in said first state, each of said second means being settable only when the preference means related to the device specified by said address means specifies preference for a system other than the related system;

selection signal means in each system responsive to related ones of said first bistable means for sending a unit selection signal to the specified one of said devices;

and starting means in each unit responsive to receipt of a selection signal when the related one of said preference means does not indicate preference for other than the related system for starting the operation of the specified unit.

3. The invention described in claim 2 further including, sensing means for sensing when said preference means is in a period of transition;

and wherein said starting means includes means for starting said unit in response to said selection signal and a signal from said sensing means notwithstanding the setting of said preference means in a case where said preference means is in a period of transition, from indicating preference to the system related to the selection signal received, to indicating preference for another one of said systems.

4. The invention described in claim 3, wherein:

said period of transition comprises a length of time related to the time for a signal from said first bistable means to reach a related starting means, and the time for the condition of said availability means to reach related ones of said first means.

5. The invention described in claim 1, additionally comprising for each system:

a settable busy means for each of said units, each of said busy means connected to a different one of said selection means to indicate the busy status of the unit connected to said one of said selection means after it is selected by inhibiting when set the operation of said one of said selection means;

a plurality of second connecting means each connecting the storage reference means of a unit to the busy means which is connected to the selection means which in turn is connected to that unit, said connecting means operative to set the busy means and thereby inhibit further energization of the selection means.

6. The invention described in claim 2, wherein:

said selection signal means in each system is also responsive to related ones of said second bistable means for sending a unit selection signal to the specified one of said devices;

and additionally comprising:

means in each device responsive to receipt of a selection signal concurrently with the related preference means indicating preference for another system for setting said preference means to indicate preference for the system from which the selection signal is received.

7. The invention described in claim 1, additionally comprising:

a plurality of second bistable means, one for each of said first bistable means and each connected to a different unit addressing means;

and means in each device responsive to a signal generated by a related one of said second bistable means for setting the related one of said preference means into a state indicating preference for the system which specified the device.

8. The apparatus of claim 1 further including, a plurality of settable availability indicators, one in each system for each unit for indicating when set that the unit is available and when reset not available to the system, said plurality of indicators including, first, second, third and fourth availability groups consisting of indicators connected, respectively, to said first, second, third, and fourth ones of said preference means, said preference means being operative when in said first state to set the respective availability indicators in said availability groups.

9. The apparatus of claim 5 further including:

a plurality of settable availability indicators, one in each system for each unit for indicating when set that the unit is available and when reset not available to the system, said plurality of indicators including, first, second, third and fourth availability groups consisting of indicators connected, respectively, to said first, second, third, and fourth ones of said preference means, said preference means being operative when in said first state to set the respective availability indicators in said availability groups;

a plurality of third connecting means in each system connecting the busy indicator for a unit to the availability indicator for that unit, said busy indicators when set being operative to reset the respective availability indicators.

10. A data processing apparatus including a plurality of systems and at least one data-responsive unit, comprising:

addressing means in system capable of generating at least one unit selection signal for specifying an addressed unit;

a plurality of unit access-determining means, each one connected to a different one of said addressing means, each of said access-determining means being settable to a first or second state, said first state being operative to indicate that the system of the connected addressing means may gain access to the addressed unit and operative to select said addressed unit when the access-determining means is in said first state at the time the connected addressing means generates a unit selection signal;

means in each access-determining means responsive to the unit selection signal of the connected addressing means for switching that accessing-determining means to said first state when that access-determining means is in said second state at the time the connected addressing means generates a unit selection signal.

11. The invention described in claim 10, additionally comprising:

one or more unit starting means, each starting means connected to a different unit, each starting means connected to one of said access-determining means and connected to the same addressing means to which said one of said access-determining means is connected so as to start the operation of an addressed unit when said one of said access-determining means is in said first state at the time of said selection signal.

12. The invention described in claim 11 additionally comprising:

a busy means for each unit, each of said busy means responsive to one of said starting means to indicate the busy status of the unit to which said one of said starting means is connected after it is started and for inhibiting the operation of said one of said starting means so that said one of said starting means cannot start the connected unit when the busy means indicates the unit is busy.

13. The invention described in claim 5, additionally comprising:

bias means responsive to the settings of said busy means for all of the units and all of the systems relating to a device to force said preference means to indicate preference for a designated one of said systems.

14. The invention described in claim 12, additionally comprising:

bias means responsive to the busy means status of a related unit to force said access-determining means to a known state.

15. Data processing apparatus including a plurality of systems and at least one data responsive unit, comprising:

means in each system capable of generating at least one unit selection signal;

and unit access determining means, one corresponding to each of said selection signals, said access determining means being settable to either one of first and second states so as to indicate whether the system related to the selection signal may gain access to a unit with which said access determining means is associated or not, respectively, said access determining means reversing its state only in response to a unit selection signal indicating that a different system is seeking access of said unit.

References Cited

UNITED STATES PATENTS

| | | | |
|---|---|---|---|
| 3,309,672 | 3/1967 | Brun et al. | 340—172.5 |
| 3,303,472 | 2/1967 | Chalker et al. | 340—172.5 |
| 3,302,182 | 1/1967 | Lynch et al. | 340—172.5 |
| 3,295,108 | 12/1966 | Harris et al. | 340—172.5 |
| 3,278,906 | 10/1966 | Gountanis et al. | 340—172.5 |
| 3,274,561 | 9/1966 | Hallman et al. | 340—172.5 |
| 3,263,219 | 7/1966 | Brun et al. | 340—172.5 |
| 3,226,692 | 12/1965 | Fuller et al. | 340—172.5 |
| 3,226,689 | 12/1965 | Amdahl et al. | 340—172.5 |
| 3,214,739 | 10/1965 | Gountanis et al. | 340—172.5 |

GARETH D. SHAW, *Primary Examiner.*

PO-1050
(5/69)

UNITED STATES PATENT OFFICE
CERTIFICATE OF CORRECTION

Patent No. 3,445,819 Dated May 20, 1969

Inventor(s) James C. Cooper, William P. Wissick

It is certified that error appears in the above-identified patent and that said Letters Patent are hereby corrected as shown below:

In the claims, Claim 1, column 14, line 42, the word --fourth-- should be added before the word "bistable".

SIGNED AND
SEALED
OCT 21 1969

(SEAL)
Attest:

Edward M. Fletcher, Jr.
Attesting Officer

WILLIAM E. SCHUYLER, JR.
Commissioner of Patents 623-2721-0